United States Patent [19]
Driver et al.

[11] Patent Number: 5,167,901
[45] Date of Patent: Dec. 1, 1992

[54] METHOD OF EVERTING A TUBE

[76] Inventors: F. Thomas Driver, 6710 Kirby Oaks La., Memphis, Tenn. 38119; Joseph A. Alexander, 1609 S. Perkins, Memphis, Tenn. 38117; Lloyd G. Buchanan, 134 W. Lawnwood, Collierville, Tenn. 38017

[21] Appl. No.: 840,851

[22] Filed: Feb. 25, 1992

Related U.S. Application Data

[62] Division of Ser. No. 593,794, Oct. 5, 1990.

[51] Int. Cl.$^5$ .............................................. B29C 63/36
[52] U.S. Cl. ...................................... 264/570; 264/36; 264/269; 264/516; 264/558; 156/287; 156/294; 427/238
[58] Field of Search ............... 264/36, 516, 558, 559, 264/570, 572, 573, 269; 156/287, 294, 423; 427/230, 238; 118/254, DIG. 10; 425/11, 59, 387.1, 503, 501

[56] References Cited

U.S. PATENT DOCUMENTS

| | | | |
|---|---|---|---|
| 4,368,091 | 1/1983 | Ontsuga et al. | 156/287 |
| 4,685,983 | 8/1987 | Lang, Jr. | 156/287 |

OTHER PUBLICATIONS

Brochure, "Inpipe"–6 pages–date of brochure is more than one year before the filing date of this application, Inpipe is a Scandinavian company.

Primary Examiner—Jan H. Silbaugh
Assistant Examiner—Catherine Timm
Attorney, Agent, or Firm—James & Franklin

[57] ABSTRACT

In a tube eversion apparatus a first chamber in which the eversion pressure is developed is controllably sealed by a sphincter-type valve, the valve being in turn actuated by pressure developed in a preferably separately controllable and adjustable second chamber, another chamber preferably being provided above the sphincter-type valve for containing a supply of liquid and limiting turbulence from any escape of fluid past the sphincter-type valve, the other chamber also providing apparatus for supplying heated fluid to a lay-flat hose adapted to be pulled through the sphincter-type valve by the tube being exerted. Use of the improved apparatus involves appropriate modifications of the usual eversion process involving applying and controlling the everting pressure and the pressure exerted against the sphincter-type valve by the fluid in the second chamber.

5 Claims, 5 Drawing Sheets

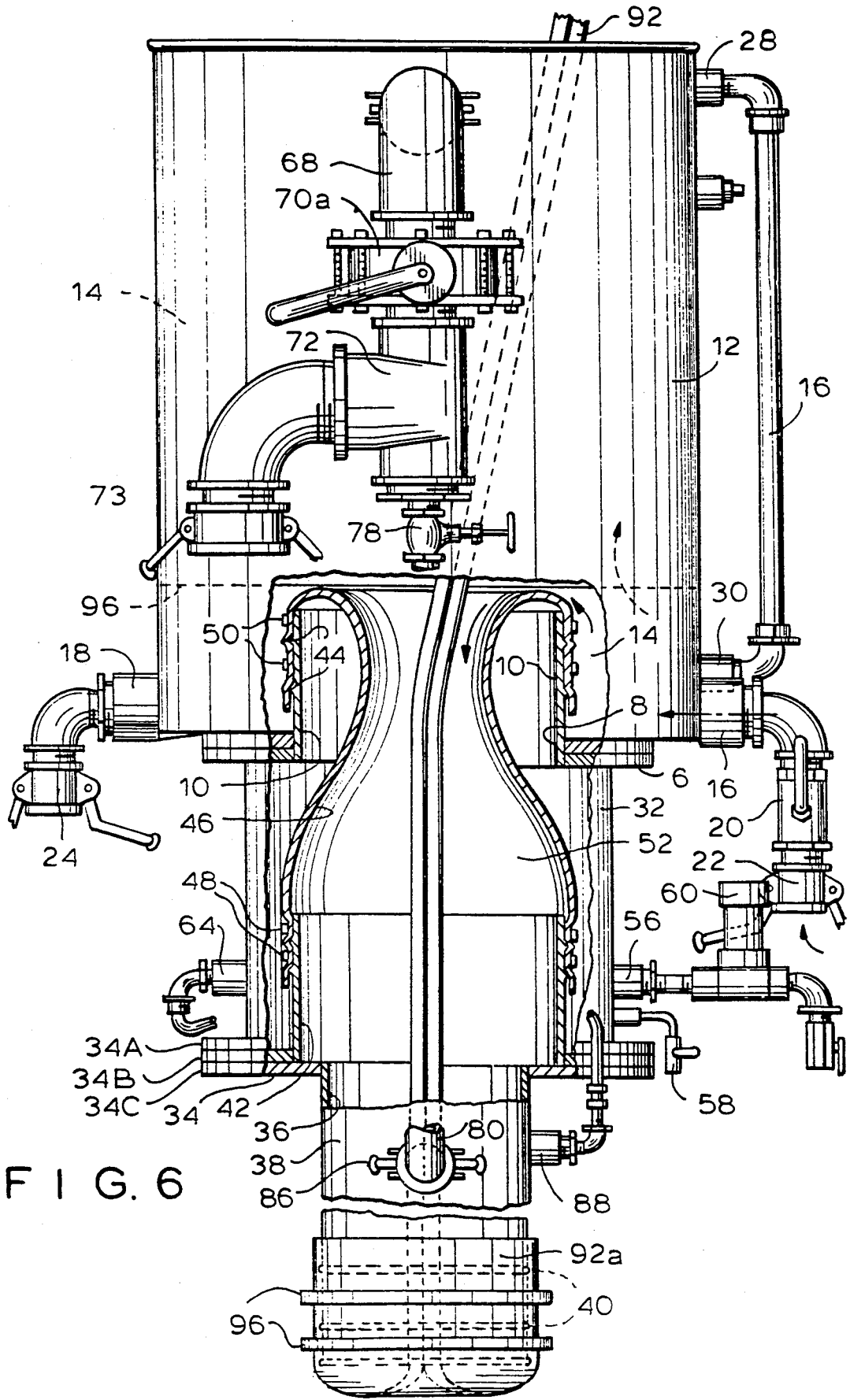
F I G. 6

METHOD OF EVERTING A TUBE

This is a divisional of copending application Ser. No. 593,794 filed on Oct. 5, 1990.

This invention relates to improvements in the apparatus, and consequent improvements in the method, employed for everting a tube such as is employed in the lining of passageways.

There are many instances when one wishes to insert a lining tube into a passageway such as a sewer pipe or other conduit. One way of doing so is to force the liner into the passageway by everting it in response to fluid pressure exerted on the inside of the lining, as disclosed, for example, in Wood U.S. Pat. No. 4,064,211 of Dec. 20, 1977 entitled "Lining of Passageways". However, lining or other tube eversion is used in other processes as well. The internal pressure which must be exerted on the lining tube in order to evert it varies with the application involved, and in particular in connection with the thickness and weight of the tube and its diameter. Purely by way of example, the eversion of a tube of resin-impregnated felt to line a passageway having an 8-inch diameter when carrying out the general procedure disclosed in the aforementioned U.S. Pat. No. 4,064,211 calls for the exertion of a pressure of approximately 8 pounds per square inch gauge. When water is used as the eversion medium, as is common, this calls for a 23-foot head of water. Hence in carrying out the method of the '211 patent it is customary to erect a scaffolding at the point of use which is 23 feet high in order to physically produce the 23-foot water head that is required for eversion. Some disadvantages of having to erect such a structure at each point of use are obvious — it is costly, time-consuming, and requires space. The latter disadvantage may not be particularly significant when working out of doors, as when lining sewer pipes passing underground, but it does greatly restrict the applicability of the eversion process where access to the passageway to be lined is at a location with a limited ceiling, such as inside a building. In addition, because the eversion pressure is developed by a physically constituted head of fluid, that pressure cannot be rapidly varied during the eversion operation, yet such a rapid variation is often desirable, as when the everting tube meets an obstruction through which it must be pushed.

There have been proposals, such as that in Wood U.S. Pat. No. 4,385,885 of May 31, 1983 entitled "Lining of Passageways", to try to seal off the chamber where the everting fluid pressure is developed and provide that everting pressure from a pump or the like, from which that pressure may be developed without having to create a physical fluid head of appropriate height. However, since the tube to be everted is usually so bulky that it must be stored outside that chamber and pass through the chamber in order to be everted, providing an effective seal through which the everting tube can slide without destroying the effectiveness of that seal in containing the everting pressure has eluded the art.

Previous attempts at this device have been unable to produce sufficient everting pressure without pinching the tube to such an extent that the resin is squeezed ("milked") along the length of the tube, with the result that the installed tube would not have adequate resin.

In accordance with the present invention the seal of the eversion pressure chamber is effected by means of a flexible element preferably defining a sphincter-like valve through which the everting tube slides, that flexible element being sealingly pressed against the tube or other element sliding therethrough by means of pressure developed in a separate chamber, which sealing pressure is preferably independent of the eversion pressure. Because of that arrangement the sealing pressure and the eversion pressure can be adjustably varied either individually or cooperatively. The sealing pressure can be pneumatic even though the eversion pressure is hydraulic, thus facilitating the flexibility of operation characteristic of the disclosed apparatus and enabling the apparatus better to accommodate dimensional or other physical variations in the tube sliding through the valve.

Hence with the present invention a structure only about 6-9 feet high takes the place of the earlier 23-foot scaffolding when eversion of an 8-inch liner is involved. Not only does this enable the apparatus to be used indoors as well as out, but it is characterized by much less initial cost, both with respect to materials and setup time, and it is much safer for the working crew — working on 23-foot high scaffolding often placed the crew members in close proximity to overhead power lines. Eversion goes faster because the optimum eversion pressure can be provided, and, indeed, can even be varied during eversion to take care of insertion problems that may arise. For example, if the tube being everted meets an obstruction and gets stuck, the eversion pressure can be raised until the obstruction is overcome and then returned to its optimum value. Moreover, by being able to control the pressure exerted by the sphincter-type valve on the tube as the latter slides through the valve one has an additional control over the eversion process, with the sphincter valve functioning as an adjustable brake as well as a pressure-containing valve.

In many lining procedures, such as that disclosed in the aforementioned U.S. Pat. No. 4,064,211, after the tube has been everted into the passageway heated fluid is circulated through the tube in order to set the resin with which the tube is impregnated. That is usually done by pulling a so-called lay-flat hose into the everted tube by the trailing end of that tube, with the heated water being fed through that hose to the far end of the everted lining and then recirculated back through the everted lining. The apparatus of the present invention is well suited to this procedure, the lay-flat hose sliding through the sphincter-type valve as it is pulled along by the everting tube without adversely affecting the everting fluid pressure. If there is any difference between the eversion-pressure-containing action of the sphincter-type valve because of physical differences between the everting lining and the lay-flat hose, those differences can be readily accommodated by varying the pressure exerted on the sphincter valve. Moreover, it has been found desirable to be able to rapidly reduce the sphincter valve pressure and then reapply it, thereby to give the everting tube a nudge, as it were, to facilitate the eversion process. The embodiment of the present invention here specifically disclosed has the added feature that it may include the fluid outlet to which the trailing end of the lay-flat hose may be connected and from which the heated fluid may be supplied.

Therefore, the prime object of the present invention is to devise an apparatus and a method of using same which will facilitate tube eversion by providing effective eversion pressure without requiring the structural attainment of a physical liquid head of appropriate height.

A further object of the present invention is to devise such an apparatus in which the eversion pressure and the restraint exerted on the everting tube may be varied both to accommodate different installation requirements and to take into consideration and overcome variations in actual eversion during a particular installation.

It is another object of the present invention to devise apparatus by means of which, during eversion, the eversion force active on the tube can be pulsated so as to facilitate the eversion operation.

It is a further object of the present invention to devise eversion apparatus which eliminates the need for towers and scaffolding and their inherent safety concerns, and in which the setup and breakdown time is minimal.

It is yet another object of the present invention to devise eversion apparatus which can develop effective eversion pressures but which can be used in areas of restricted overhead.

And it is yet a further object to modify the usual eversion process to take advantage of the functional improvements attainable with the novel structure of the present invention.

Another object is to devise inversion apparatus which can be readily adapted to use with lining tubes of different diameters, and which will effectively feed continuous lengths of tubes.

An additional object is to devise such apparatus which can selectively use hydraulic, pneumatic or steam pressure to perform various functions depending upon which type of pressure is optimum for each function.

To the accomplishment of the above, and to such other objects as may hereinafter appear, the present invention relates to the structure and mode of use of a tube eversion apparatus as defined in the appended claims and as described in this specification, taken together with the accompanying drawings in which:

FIG. 6 is a view similar to FIG. 2 but showing an alternative embodiment.

Figure 1:
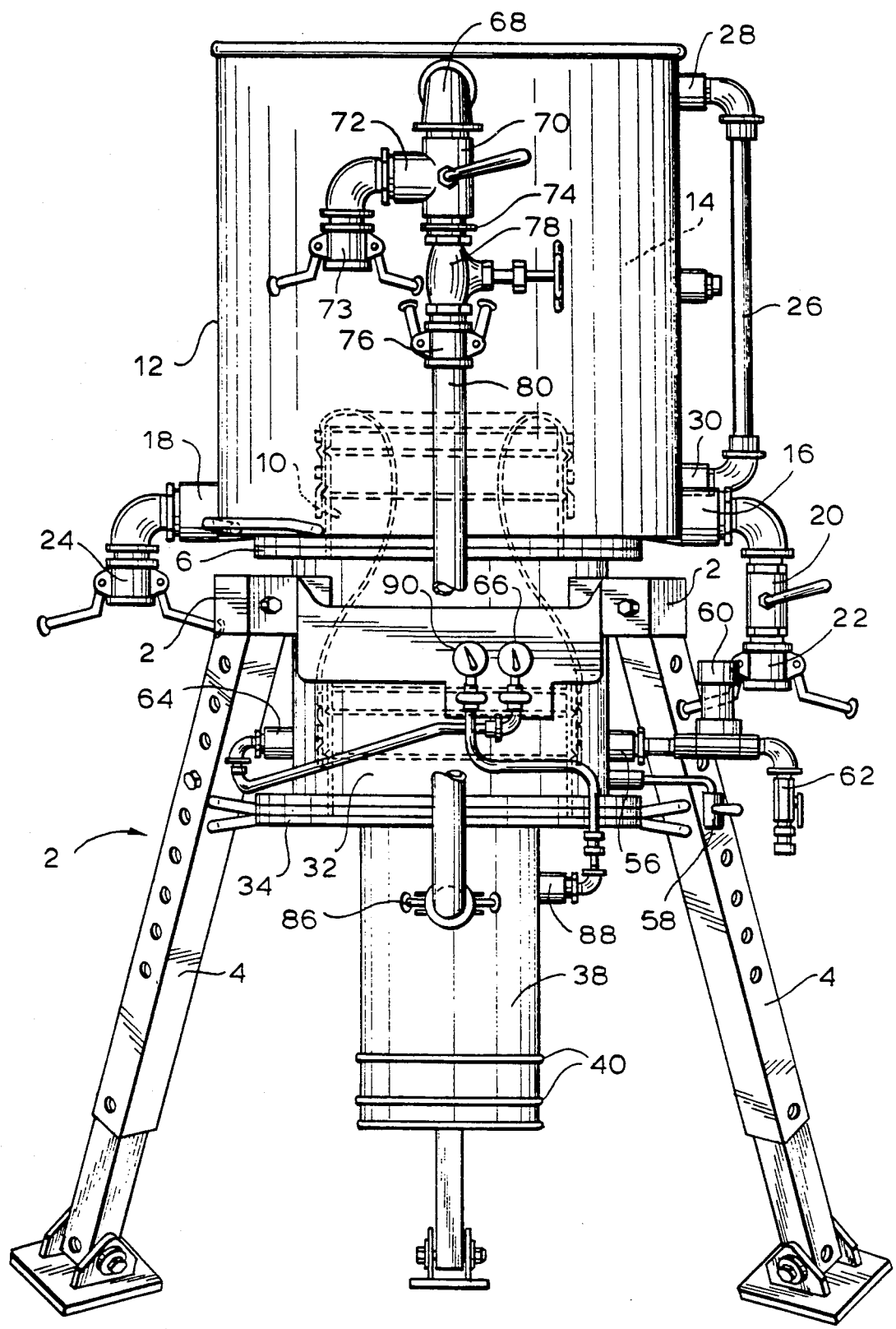
FIG. 1 is a front elevational view of one embodiment of the apparatus of the present invention.

The tube eversion apparatus comprises a supporting frame generally designed 2 provided with adjustable legs 4 for supporting the apparatus on the ground, a floor or any other supporting surface. Fixed to the supporting frame 2 is a first bottom wall 6 which is centrally apertured at 8 and which carries an upstanding cylinder 10. Carried by the bottom wall 6 is a cylindrical side wall 12 open at its top and defining therewithin a first chamber 14. A fluid inlet fitting 16 and a fluid outlet fitting 18 are provided adjacent the lower portion of the chamber 14, the fluid inlet fitting 16 communicating with a control valve 20 and a fluid connector 22, the outlet fitting 18 communicating with a fluid connector 24. A sight glass 26 communicates at 28 and 30 with the upper and lower portions of the chamber 14 so that the level of fluid in that chamber can be known.

Depending from the first bottom wall 6 is a second cylindrical wall 32 to which a second bottom wall 34 is connected, that second bottom wall 34 being constructed of three segments 34A, 34B, 34C, with 34C being apertured at 36, and there carrying a downwardly depending cylindrical wall 38 which is open at its bottom end and which is provided with external ribs 40 adjacent that bottom end. A cylindrical wall 42 extends up from the second bottom wall 34B around the aperture 36. That wall 42, as well as the cylindrical wall 10, are preferably provided with ribs 44 on their exterior. Wall 38, permanently attached to 34C, is readily removable from 34B, thus facilitating the changing of diameter of wall 38 and therefore changing tube diameter.

A flexible wall 46 formed of a suitable flexible rubbery or plastic material and in tubular form is secured to and extends between cylindrical walls 10 and 42, being sealingly held in place on the exterior of the wall 42 and against the ribs 44 thereon by straps 48, the wall 46 extending up through the interior of the cylindrical wall 10 and being secured to the exterior thereof, sealingly pressed against the ribs 44 thereon by means of straps 50. The wall 46 may be formed of a sheet of polyvinyl chloride reinforced with nylon.

The space inside the wall 38 and the wall 42 defines a second chamber 52 and the space between the flexible wall 46, the cylindrical wall 10 and the side wall 32 defines a third chamber 54.

Figure 3:
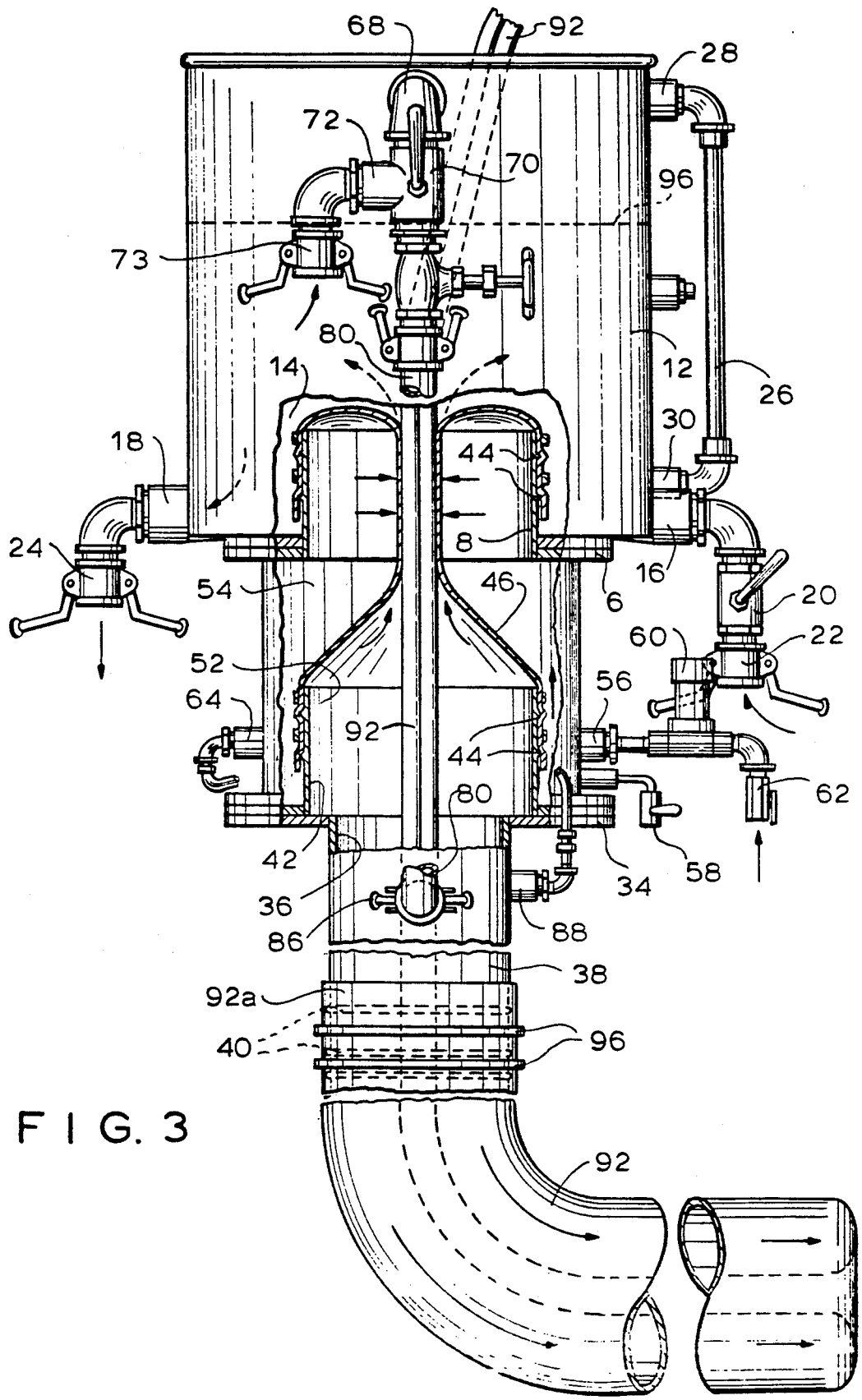
FIG. 3 is a view similar to FIG. 2 but showing the tube in the process of being everted.

The wall 32 is provided with a fluid inlet 56 which communicates with a pressure adjusting means 60 and a joint 62 adapted to be connected to an external source of fluid under pressure. The wall 32 is also provided with an access fitting 64 which communicates with a pressure indicator 66. The wall 32 is also provided with yet another access fitting which communicates with an exhaust control valve 58 (FIG. 3).

Figure 5:
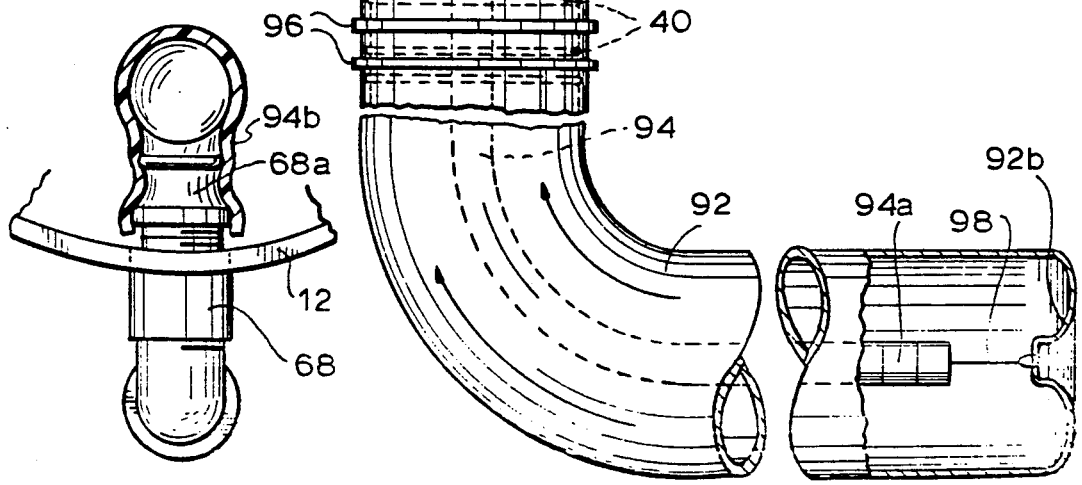
FIG. 5 is a fragmentary top elevational view of the structure of FIG. 4 showing the manner of attachment of the lay-flat hose.

A pipe 68 extends through the wall 12 adjacent its upper open end and, externally of the wall 12, communicates with a valved joint 70 having inlet fitting 72 and outlet fitting 74, the latter communicating with a connector 76 via a valve 78. The end of pipe inside chamber 14 defines a nipple 68a (see FIG. 5). The connector 76 connects to hose 80 which extends down to the wall 38 and there communicates with a connector 86 and an inlet opening through the wall 38. The wall 38 is provided with an outlet fitting 88 which communicates with a pressure indicator 90.

The apparatus of the present invention is desirably used for the eversion into a remote conduit such as an underground sewer pipe of a tube 92 which may comprise resin-impregnated felt which is designed to function, after the resin in the felt has been cured, as a lining for the sewer pipe or the like into which it has been introduced, substantially as described in the aforementioned Wood U.S. Pat. No. 4,064,211, but it will be understood that the apparatus of the present invention is not limited thereto, but has applicability in other lining systems. As here specifically disclosed by way of exemplification, once the tube 92 has been everted into position to line the sewer pipe or the like, heated fluid is provided inside the tube 92, that heated fluid serving to retain the liner firmly against the inside of the sewer pipe and the like and to provide the heat necessary to cause the resin to set. This fluid is provided through a lay-flat hose 94.

Figure 2:
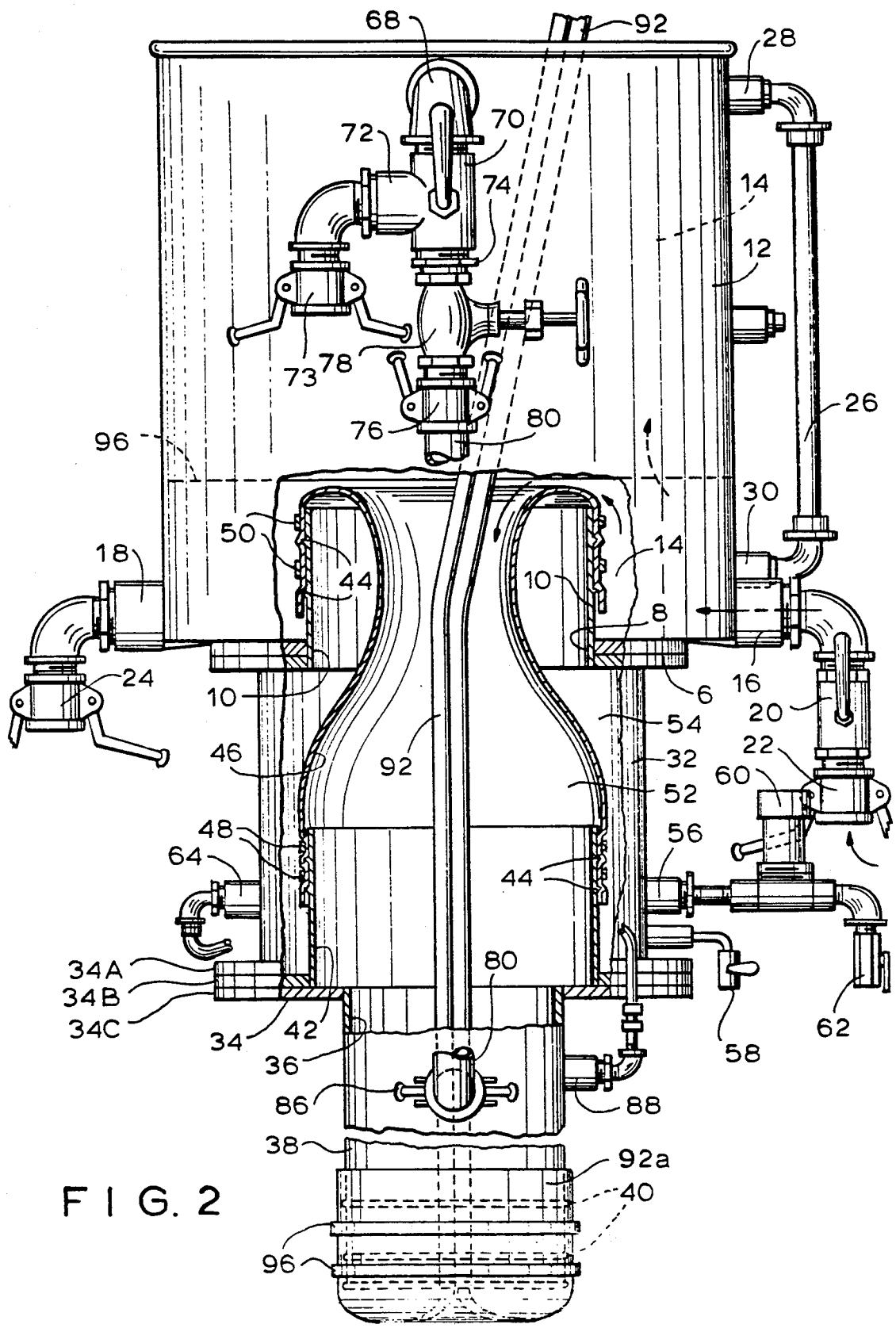
FIG. 2 is an enlarged view of the operative portion of said apparatus partially broken away and showing a tube to be everted in place.

A preferred method of using the apparatus of the present invention so as to provide the pressure needed to evert the liner tube 92, but without having to employ a physical fluid head of appropriate magnitude, is as follows. Having reference first to FIG. 2, the tube 92 to be everted is fed down through the chambers 14 and 52 and its leading end 92 is cuffed back over the outer surface of the cylinder 38 and is there secured by straps 96, thus closing the lower end of the chamber 52. The valve 20 is opened as indicated in FIG. 2, and fluid such as water from a hydrant or other fluid source is fed through the inlet 16 into the chamber 14, that fluid, as its level in the chamber 14 rises, then spilling over the top of the flexible wall 46 into the chamber 52 and filling the latter, escape of water from the bottom of the chamber 52 being prevented by the cuffed back tube 92. The outlet 18 is connected to the suction end of a fluid pump which at this point in time is turned off, so that water cannot escape from the outlet 18. Fluid from the hydrant continues to be supplied until the water level in the chamber 14 reaches a desired height, such as is indicated at 96 in FIG. 3, at which time the valve 20 is closed.

Next, fluid under pressure is supplied via the connector 62 and pressure adjustment valve 60 and the inlet 56 to the chamber 54. This presses the wall 46 sealingly against a substantial length of the tube 92, thus separating the chambers 14 and 52. The pressure provided to the chamber 54 is preferably air pressure, and is selected so as to effectively substantially seal off the upper end of chamber 52 while permitting the tube 92 to slide therethrough.

Next, fluid under pressure, preferably water, is provided to the chamber 52 from an external pump, the suction end of which is in communication with the connector 24. The pump provides that fluid to connector 72, and the valve 70 is set so that said fluid passes through outlet 74, valve 78, connector 76, hose 80 and connector 86 into the now substantially sealed chamber 52. The fluid is there provided at the pressure needed to evert the tube 92. For example, in order to evert a tube 92 having an internal diameter of approximately 8 inches a water pressure of approximately 8 pounds per square inch gauge is needed. By providing a pressure within the chamber 54 only somewhat larger, perhaps by 1 pound per square inch, than the water pressure in chamber 52, the 8 pounds per square inch pressure within chamber 52 is contained and, as indicated in FIG. 3, by reason of that pressure the tube 92 is progressively everted and extended out from the apparatus of the present invention, the trailing portion of the tube 92 sliding through the sphincter-type valve defined by the wall 46. The pressure of the wall 46 on the tube 92 sliding therethrough exerts a braking force on the everting tube. Since the everting process is derived from the external pump, adjustment of valve 78 can provide for variation in the everting pressure. The everting pressure can be further controlled by varying the pressure in chamber 54 by means of pressure-adjusting means 60. Since the pump which provides the water under pressure for the chamber 2 gets its supply of water from the chamber 14 via outlet 18, during this eversion process the supply of water in the chamber 14 is maintained essentially constant by controlling the inflow of water from the hydrant through adjustment of the valve 20. Because of the relatively high pressure of the water in the chamber 52 some of it may escape between the wall 46 and the tube 92, but that escape will be inhibited by the water within the chamber 14.

Figure 4:
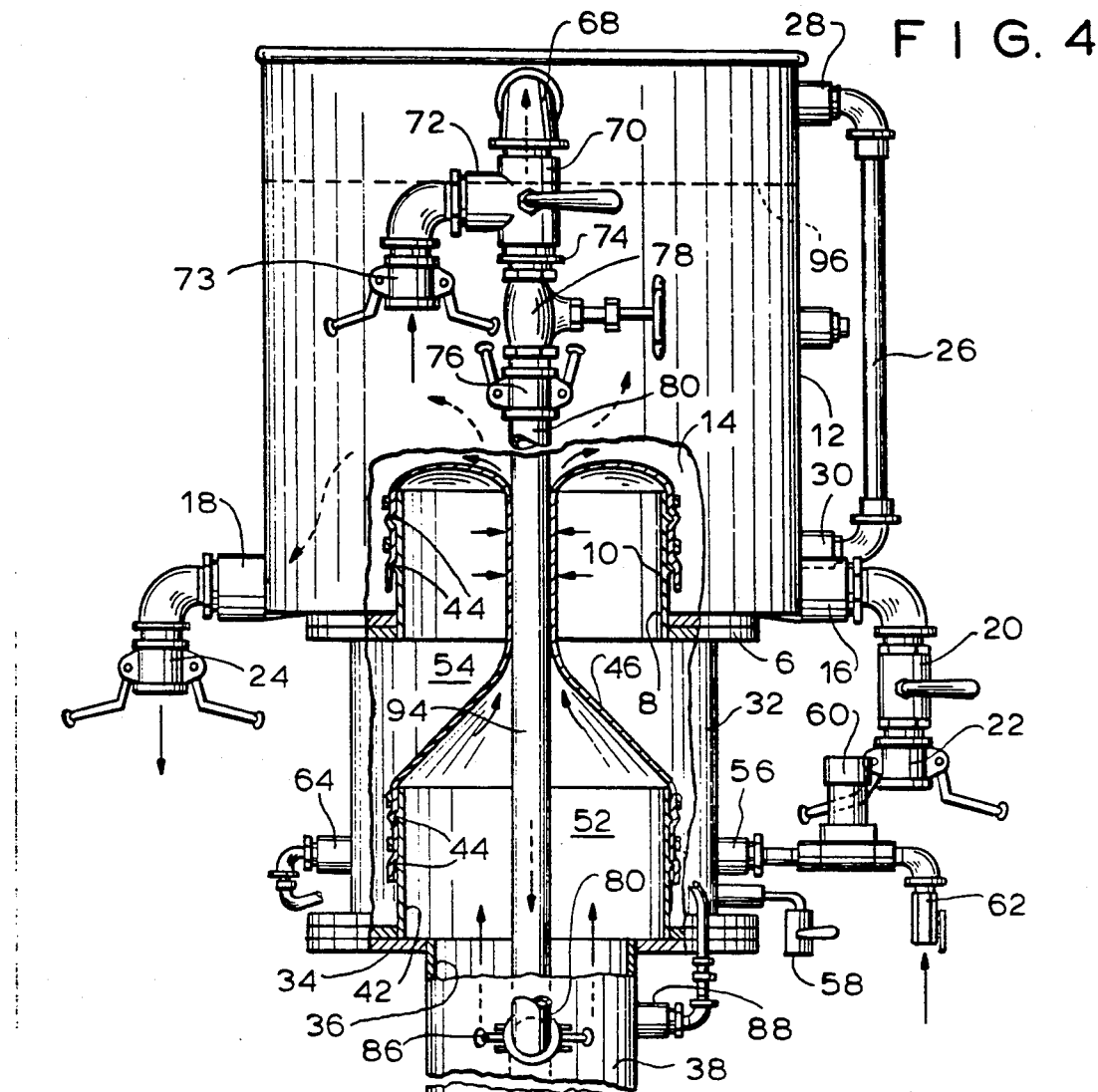
FIG. 4 is a view similar to FIG. 2 but showing the tube fully everted and with the lay-flat hose in position for supplying curing fluid.

After the eversion process has proceeded until the trailing end 92b of the tube 92 is close to the open top of the chamber 14, the leading end 94a of the lay-flat hose 94 is connected thereto by line 98, and the trailing end 94b of the lay-flat hose 94 is connected to the nipple 68a. Eversion then continues, with the hose 94 sliding through the sphincter valve defined by the wall 46, until the eversion is complete (see FIG. 4). During the latter portion of that eversion, after the trailing end 92b of the tube 92 has moved through the wall 46 and into the chamber 52, the fluid pressure within the chamber 54 will, as shown in FIG. 4, cause the wall 46 to sealingly engage the lay-flat hose 94, thus effectively closing the upper end of the chamber 52 but permitting the lay-flat hose 94 to slide therethrough. The sphincter valve pressure may be adjusted by the pressure-adjusting means 60 to accommodate for physical differences between the tube 92 and the hose 94, if called for, in order to maintain the integrity of the fluid pressure developed in the chamber 54. When eversion is complete the lining tube 92 is within the sewer pipe or the like and is pressed against the interior of that pipe by the pressure of the everting water.

As indicated in FIG. 4, after eversion is complete the external pump provides heated fluid such as water and the valve 70 is adjusted so that the flow of that heated water is directed through the nipple 68a into the lay-flat hose 94, that heated water then escaping from the leading end 94a of the lay-flat hose 94 and circulating back through the length of the tube 92 into the chamber 52 and then out from the chamber 52, between the lay-flat hose 94 and the flexible wall 46, into the chamber 14, and out from the chamber 14 and the outlet 18 back to the pump. The pressure exerted on the sphincter valve may be adjusted to facilitate flow of the heated fluid through the sphincter valve if such adjustment is appropriate. This procedure continues for the period of time needed to cause the resin within the tube 92 to set. The pressure in the chamber 54 may be adjusted to provide for optimum functioning during this period, that being accomplished through adjustment of the valve control 60.

It should be noted that because the pressure within the chamber 54 can be varied independently of the eversion pressure produced within the chamber 52, not only can optimum effective sealing of the upper end of the chamber 52 be effected, but the pressure of the wall 46 on the tube 92 or lay-flat hose 94 can be adjusted to take into account the different sizes and surface characteristics of the tube 92 and hose 94 respectively, and also to function as a brake or as a start-and-stop control for eversion in conjunction with variations in water pressure. The eversion pressure developed in chamber 52 can be independently controlled relative to the sealing pressure developed in chamber 54. The preferred use of air to develop the pressure in chamber 54, whereas water is preferably used to develop the eversion pressure in chamber 52, gives rise to greater facility of control of the desired effect of the wall 46 on the tube 92 and/or hose 94 as the latter slides therethrough. Exhaust control valve 58 has been found to be particularly effective in taking care of transient conditions experienced during eversion since through actuation of the valve 58 one can instantaneously remove pressure from the chamber 54 and then quickly reestablish it, to in effect nudge the tube 92 along, which has proved to be helpful in many situations, such as if the tube 92 slows down or stops while the eversion is being carried out.

FIG. 6 shows an alternative embodiment in which the three-way valve 70 of the earlier described embodiment is replaced by a two-way valve 70a and the inlet following 72 is located between the valve 70a and opening valve 78. Cure is initiated by slowly opening valve 70a and slowly closing valve 78. During cure valve 70a is open and valve 78 is closed.

A typical embodiment of the present invention will be only approximately 6 feet tall, yet a fluid pressure suitable to effect eversion is produced, which pressure in the past has required a structure 23 feet tall. From this it will be appreciated that the structure of the present invention is physically superior to prior structures in which an actual 23-foot water head had to be produced, and makes the equipment usable in locations, such as indoors or where there are physical obstructions, where the eversion apparatus of the prior art could not be used.

The use of a flexible wall extending completely around the tube and/or lay-flat hose, thus functioning as a sphincter valve, the pressure of which valve on the tube or hose is readily controllable and adjustable, preferably independently of the pressure developed to produce eversion, is an important factor in making this invention practical and in providing great flexibility in its use.

While but a single embodiment of the present invention has been here specifically disclosed, it will be apparent that many variations may be made therein, all within the spirit of the invention as defined in the following claims:

We claim:

1. In connection with tube eversion apparatus comprising a housing having an open top and open bottom through which a tube to be everted can pass, said housing comprising first and second chambers communicating with one another by a passage defined at least in part by a flexible wall, through which passage said tube is adapted to pass with said wall in engagement therewith, said housing comprising a third chamber with said flexible wall defining a surface thereof, said second chamber terminating in an outlet to which an end of said tube is adapted to be secured, thereby in effect to close the bottom of said second chamber, the method of tube eversion comprising (1) feeding the tube to be everted through said first chamber, passage and said second chamber and securing the leading edge of said tube to said outlet, (2) supplying fluid at an elevated pressure to said third chamber so as to press said flexible wall against said tube, thereby to substantially separate said first and second chambers, and (3) while retaining the fluid in said third chamber at an elevated pressure, supplying fluid to said second chamber at a sufficiently elevated pressure to act on said tube to evert it out from said apparatus while causing said tube to move axially along and past said flexible wall.

2. In the method of claim 1, supplying to said first chamber fluid at a sufficiently elevated pressure to retain said fluid in said second chamber substantially at its said elevated pressure.

3. In the method of claim 1, supplying fluid to said first chamber until the level of fluid therein stands at a predetermined position sufficient to retain said fluid pressure in said second chamber substantially at its said elevated pressure, and maintaining said fluid level in said first chamber substantially at said predetermined position while said tube passes through said first and second chambers and is everted out from said apparatus.

4. In the method of any of claims 1-3, attaching one end of a hose to the trailing end of said tube, continuing the eversion of said tube from said apparatus while substantially retaining said elevated pressure in said second chamber until said tube is fully everted, and then supplying fluid to said hose so that said fluid can pass through said hose and then act upon the interior of said everted tube.

5. The method of claim 4, in which means are exposed in said first chamber for providing a flow of fluid thereto, said means terminating in an end, the step of providing fluid to said hose comprising attaching the other end of said hose to said end of said fluid-providing means exposed in said first chamber.

* * * * *